(12) United States Patent
Narita et al.

(10) Patent No.: US 7,853,448 B2
(45) Date of Patent: Dec. 14, 2010

(54) ELECTRONIC INSTRUMENT FOR SPEECH RECOGNITION WITH STANDBY TIME SHORTENING AND ACOUSTIC MODEL DELETION

(75) Inventors: Shusuke Narita, Daito (JP); Susumu Tokoshima, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 911 days.

(21) Appl. No.: 11/785,241

(22) Filed: Apr. 16, 2007

(65) Prior Publication Data

US 2007/0244705 A1    Oct. 18, 2007

(30) Foreign Application Priority Data

Apr. 17, 2006    (JP)    ............. 2006-113635

(51) Int. Cl.
G10L 15/22    (2006.01)
G10L 15/06    (2006.01)

(52) U.S. Cl. ............. 704/236; 704/244; 704/275
(58) Field of Classification Search ........ 704/235, 704/236, 270, 275, 244
See application file for complete search history.

(56) References Cited

U.S. PATENT DOCUMENTS

| | | | | |
|---|---|---|---|---|
| 6,148,105 | A * | 11/2000 | Wakisaka et al. | 382/190 |
| 6,173,266 | B1 * | 1/2001 | Marx et al. | 704/270 |
| 6,718,304 | B1 | 4/2004 | Tachimori et al. | |
| 6,766,295 | B1 * | 7/2004 | Murveit et al. | 704/243 |
| 6,937,984 | B1 | 8/2005 | Morgan et al. | |
| 7,103,542 | B2 * | 9/2006 | Doyle | 704/231 |
| 7,194,409 | B2 * | 3/2007 | Balentine et al. | 704/253 |
| 7,228,276 | B2 * | 6/2007 | Omote et al. | 704/243 |
| 7,321,856 | B1 * | 1/2008 | Porter et al. | 704/270.1 |
| 7,349,851 | B2 * | 3/2008 | Zuberec et al. | 704/270 |
| 7,533,023 | B2 * | 5/2009 | Veprek et al. | 704/270.1 |
| 7,552,055 | B2 * | 6/2009 | Lecoeuche | 704/270.1 |
| 7,680,658 | B2 * | 3/2010 | Chung et al. | 704/235 |

(Continued)

FOREIGN PATENT DOCUMENTS

GB    2 344 917 A    6/2000

(Continued)

OTHER PUBLICATIONS

European Search Report dated May 31, 2007 (five (5) pages).

*Primary Examiner*—Martin Lerner
(74) *Attorney, Agent, or Firm*—Crowell & Moring LLP

(57) ABSTRACT

An electronic instrument includes: a display control unit for displaying a control content corresponding to the command information based on the result of the speech recognition; an instruction unit for instructing that a control for the control content displayed by the display control unit, is cancelled; a control unit for performing the control based on the command information based on the result of the speech recognition after a predetermined standby time elapses since the control content corresponding to the command information based on the result of the speech recognition starts to be displayed by the display control unit when the instruction unit does not instruct that the control for the control content is cancelled within the predetermined standby time, and for canceling the control based on the command information based on the result of the speech recognition when the instruction unit instructs that the control is cancelled within the predetermined standby time.

3 Claims, 5 Drawing Sheets

U.S. PATENT DOCUMENTS

| | | | |
|---|---|---|---|
| 2005/0171775 A1* | 8/2005 | Doyle | 704/250 |
| 2007/0033053 A1* | 2/2007 | Kronenberg et al. | 704/275 |
| 2007/0150287 A1* | 6/2007 | Portele et al. | 704/275 |
| 2008/0109220 A1* | 5/2008 | Kiss | 704/235 |

FOREIGN PATENT DOCUMENTS

| | | |
|---|---|---|
| JP | 09-322086 A | 12/1997 |
| JP | 2000-322086 A | 11/2000 |
| JP | 2002-290859 A | 10/2002 |

* cited by examiner

FIG.2

| COMMAND | ACOUSTIC MODEL | EXECUTION | CANCEL | STANDBY TIME | DISPLAYED COMMAND |
|---|---|---|---|---|---|
| ON | 1 | 13 | 1 | 2 | RESULT OF SPEECH RECOGNITION: ARE YOU SURE THE SPEECH IS "ON"? |
|  | 2 | 2 | 20 | 5 |  |
|  | 3 | 1 | 0 | 5 |  |
| OFF | 1 | 10 | 2 | 3 | RESULT OF SPEECH RECOGNITION: ARE YOU SURE THE SPEECH IS "OFF"? |
|  | 2 | 4 | 3 | 5 |  |
|  | 3 | 5 | 0 | 4 |  |
| CHANNEL UP |  | 20 | 0 | 3 |  |
| ⋮ | ⋮ | ⋮ | ⋮ | ⋮ | ⋮ |

FIG.3

RESULT OF SPEECH RECOGNITION:
ARE YOU SURE THE SPEECH IS "ON"?

(CANCEL)

ELECTRONIC INSTRUMENT FOR SPEECH RECOGNITION WITH STANDBY TIME SHORTENING AND ACOUSTIC MODEL DELETION

BACKGROUND OF THE INVENTION

1. Field of the Invention

The present invention relates to an electronic instrument capable of performing various controls by speech recognition.

2. Description of the Related Art

In recent years, as an electronic instrument such as a television and a radio has been more multifunctional and more functionally sophisticated, such an electronic instrument that is ready for various functions and is easily operable has been required. At present, an electronic instrument using a speech recognition technology for such an operation is used.

The electronic instrument includes a digital broadcast receiving apparatus that searches a broadcast program based on a keyword, for example, inputted by voice by a user and displays a result of the search based on the keyword (refer to JP-Tokukai-2002-290859A as Patent Document 1).

Moreover, there is a program reservation system, in which a user can select a desired category from among categories for guiding the programs, for example, such as "Weather Forecast", "News", and "Baseball", which are displayed as a list on TV display unit, and further can select a name of a desired program by voice from among programs displayed as a list after confirming programs names, broadcasting times, broadcast channels, and broadcast contents relating to programs which coincide with the category selected by voice (refer to JP-Tokukai-H09-322086A as Patent Document 2).

Furthermore, there is a speech recognition apparatus in which when the electronic instrument is controlled based on a speech signal inputted from a microphone, it is made easy to recognize a mode of the control by dynamically displaying a character and the like on a monitor (refer to JP-Tokukai-2000-322086A as Patent Document 3).

However, although the apparatuses disclosed in Patent Documents 1 to 3 have a function to display results of the speech recognition, the function merely makes it easy to grasp the results of the speech recognition by means of visual recognition, and cannot prevent in advance a malfunction caused by erroneous recognition of the speech recognition.

SUMMARY OF THE INVENTION

An object of the present invention to provide an electronic instrument capable of preventing in advance the malfunction caused by the erroneous recognition of the speech recognition.

In accordance with a first aspect of the invention, in an electronic instrument which performs speech recognition by an acoustic model pattern for speech information inputted from an outside, and which is controlled by command information obtained based on a result of the speech recognition, the electronic instrument comprises:

a display control unit for displaying a control content corresponding to the command information based on the result of the speech recognition, on a display unit;

an instruction unit for instructing that a control for the control content displayed on the display unit by the display control unit, is cancelled;

a control unit for performing the control based on the command information based on the result of the speech recognition after a predetermined standby time elapses since the control content corresponding to the command information based on the result of the speech recognition starts to be displayed on the display unit by the display control unit when the instruction unit does not instruct that the control for the control content is cancelled within the predetermined standby time, and for canceling the control based on the command information based on the result of the speech recognition when the instruction unit instructs that the control for the control content is cancelled within the predetermined standby time;

a shortening unit for shortening the standby time when a ratio of the number of executions in which one kind of the command information based on the result of the speech recognition is executed with respect to the number of displays in which a control content corresponding to the one kind of command information is displayed on the display unit by the display control unit, exceeds a first set value;

a command information storage unit for storing the one kind of command information and a plurality of the acoustic model patterns so as to refer the one kind of command information to the plurality of the acoustic model patterns; and a command information deletion unit for deleting one acoustic model pattern relating to the one kind of command information from the command information storage unit when a ratio of the number of cancellations in which the one kind of command information based on the result of the speech recognition by the one acoustic model pattern is cancelled with respect to the number of displays in which the control content corresponding to the one kind of command information is displayed on the display unit by the display control unit, exceeds a second set value.

According to the first aspect of the invention, the control content corresponding to the command information based on the result of the speech recognition by the acoustic model pattern can be displayed on the display unit by the display control unit. Moreover, the control for the control content displayed on the display unit by the display control unit can be instructed to be cancelled by the instruction unit. Furthermore, the control can be performed by the control unit based on the command information based on the result of the speech recognition after a predetermined standby time elapses since the control content corresponding to the command information based on the result of the speech recognition starts to be displayed on the display unit by the display control unit when the instruction unit does not instruct that the control for the control content is cancelled within the predetermined standby time. Meanwhile, the control based on the command information based on the result of the speech recognition can be cancelled by the control unit when the instruction unit instructs that the control for the control content is cancelled within the predetermined standby time.

Hence, it is possible to control the electronic instrument after the user confirms whether or not the control content corresponding to the command information obtained based on the result of the speech recognition is one intended by the user. In such a way, a malfunction of the electronic instrument, which is caused by erroneous recognition, can be prevented in advance.

Moreover, by the command information storage unit, the one kind of command information and the plurality of acoustic model patterns can be stored so as to refer the one kind of command information to the plurality of acoustic model patterns. Furthermore, the standby time can be shortened by the shortening unit when the ratio of the number of executions in which the one kind of the command information based on the result of the speech recognition is executed with respect to the number of displays in which the control content corresponding to the one kind of command information is displayed on the display unit by the display control unit, exceeds the first set value.

Hence, with regard to the command information in which a success rate of the speech recognition is high, it is possible to shorten the standby time since the control content corresponding to the command information based on the result of the speech recognition start to be displayed on the display unit. Thus, it is possible to rapidly perform the control corresponding to the command information obtained based on the result of the speech recognition.

Furthermore, the one acoustic model pattern relating to the one kind of command information can be deleted from the command information storage unit by the command information deletion unit when the ratio of the number of cancellations in which the one kind of command information based on the result of the speech recognition by the one acoustic model pattern is cancelled with respect to the number of displays in which the control content corresponding to the one kind of command information is displayed on the display unit by the display control unit, exceeds the second set value.

Hence, with regard to the one acoustic model pattern relating to the command information in which a possibility of the erroneous recognition is high, it is possible to delete the one acoustic model pattern from the command information storage unit. In such a way, it is possible to prevent in advance the malfunction of the electronic instrument, which is caused by the erroneous recognition, and it is possible to customize the command information storage unit.

In accordance with a second aspect of the invention, in an electronic instrument which performs speech recognition by an acoustic model pattern for speech information inputted from an outside, and which is controlled by command information obtained based on a result of the speech recognition, the electronic instrument comprises:

a display control unit for displaying a control content corresponding to the command information based on the result of the speech recognition, on a display unit;

an instruction unit for instructing that a control for the control content displayed on the display unit by the display control unit, is cancelled;

a control unit for performing the control based on the command information based on the result of the speech recognition after a predetermined standby time elapses since the control content corresponding to the command information based on the result of the speech recognition starts to be displayed on the display unit by the display control unit when the instruction unit does not instruct that the control for the control content is cancelled within the predetermined standby time, and for canceling the control based on the command information based on the result of the speech recognition when the instruction unit instructs that the control for the control content is cancelled within the predetermined standby time.

According to the second aspect of the invention, the control content corresponding to the command information based on the result of the speech recognition by the acoustic model pattern can be displayed on the display unit by the display control unit. Moreover, the control for the control content displayed on the display unit by the display control unit can be instructed to be cancelled by the instruction unit. Furthermore, the control can be performed by the control unit based on the command information based on the result of the speech recognition after a predetermined standby time elapses since the control content corresponding to the command information based on the result of the speech recognition starts to be displayed on the display unit by the display control unit when the instruction unit does not instruct that the control for the control content is cancelled within the predetermined standby time. Meanwhile, the control based on the command information based on the result of the speech recognition can be cancelled by the control unit when the instruction unit instructs that the control for the control content is cancelled within the predetermined standby time.

Hence, it is possible to control the electronic instrument after the user confirms whether or not the control content corresponding to the command information obtained based on the result of the speech recognition is one intended by the user. In such a way, a malfunction of the electronic instrument, which is caused by erroneous recognition, can be prevented in advance.

Preferably, the electronic instrument further comprises:

a shortening unit for shortening the standby time when a ratio of the number of executions in which one kind of the command information based on the result of the speech recognition is executed with respect to the number of displays in which a control content corresponding to the one kind of command information is displayed on the display unit by the display control unit, exceeds a first set value.

According to the above invention, the similar effect to that of the second aspect of the invention can be obtained. Further, the standby time can be shortened by the shortening unit when the ratio of the number of executions in which the one kind of the command information based on the result of the speech recognition is executed with respect to the number of displays that the control content corresponding to the one kind of command information is displayed on the display unit by the display control unit, exceeds the first set value.

Hence, with regard to the command information in which a success rate of the speech recognition is high, it is possible to shorten the standby time since the control content corresponding to the command information based on the result of the speech recognition start to be displayed on the display unit. Thus, it is possible to rapidly perform the control corresponding to the command information obtained based on the result of the speech recognition.

Preferably, the electronic instrument further comprises:

a command information storage unit for storing one kind of command information and a plurality of the acoustic model patterns so as to refer the one kind of command information to the plurality of the acoustic model patterns; and a command information deletion unit for deleting one acoustic model pattern relating to the one kind of command information from the command information storage unit when a ratio of the number of cancellations in which the one kind of command information based on the result of the speech recognition by the one acoustic model pattern is cancelled with respect to the number of displays in which a control content corresponding to the one kind of command information is displayed on the display unit by the display control unit, exceeds a second set value.

According to the above invention, the similar effect to that of the second aspect of the invention can be obtained. Further, by the command information storage unit, the one kind of command information and the plurality of acoustic model patterns can be stored so as to refer the one kind of command information to the plurality of acoustic model patterns. Moreover, the one acoustic model pattern relating to the one kind of command information can be deleted from the command information storage unit by the command information deletion unit when the ratio of the number of cancellations in which the one kind of command information based on the result of the speech recognition by the one acoustic model pattern is cancelled with respect to the number of displays in which the control content corresponding to the one kind of command information is displayed on the display unit by the display control unit, exceeds the second set value.

Hence, with regard to the one acoustic model pattern relating to the command information in which a possibility of the erroneous recognition is high, it is possible to delete the one acoustic model pattern from the command information storage unit. In such a way, it is possible to prevent in advance the malfunction of the electronic instrument, which is caused by the erroneous recognition, and it is possible to customize the command information storage unit.

BRIEF DESCRIPTION OF THE DRAWINGS

The present invention will become fully understood from the detailed description given hereinafter and the accompanying drawings given by way of illustration only, and thus are not intended as a definition of the limits of the present invention, wherein:

FIG. 2 is a view showing an example of a command table in the present invention;

FIG. 3 is a view showing a display example by display control unit of the present invention;

DETAILED DESCRIPTION OF THE PREFERRED EMBODIMENT

Figure 1:
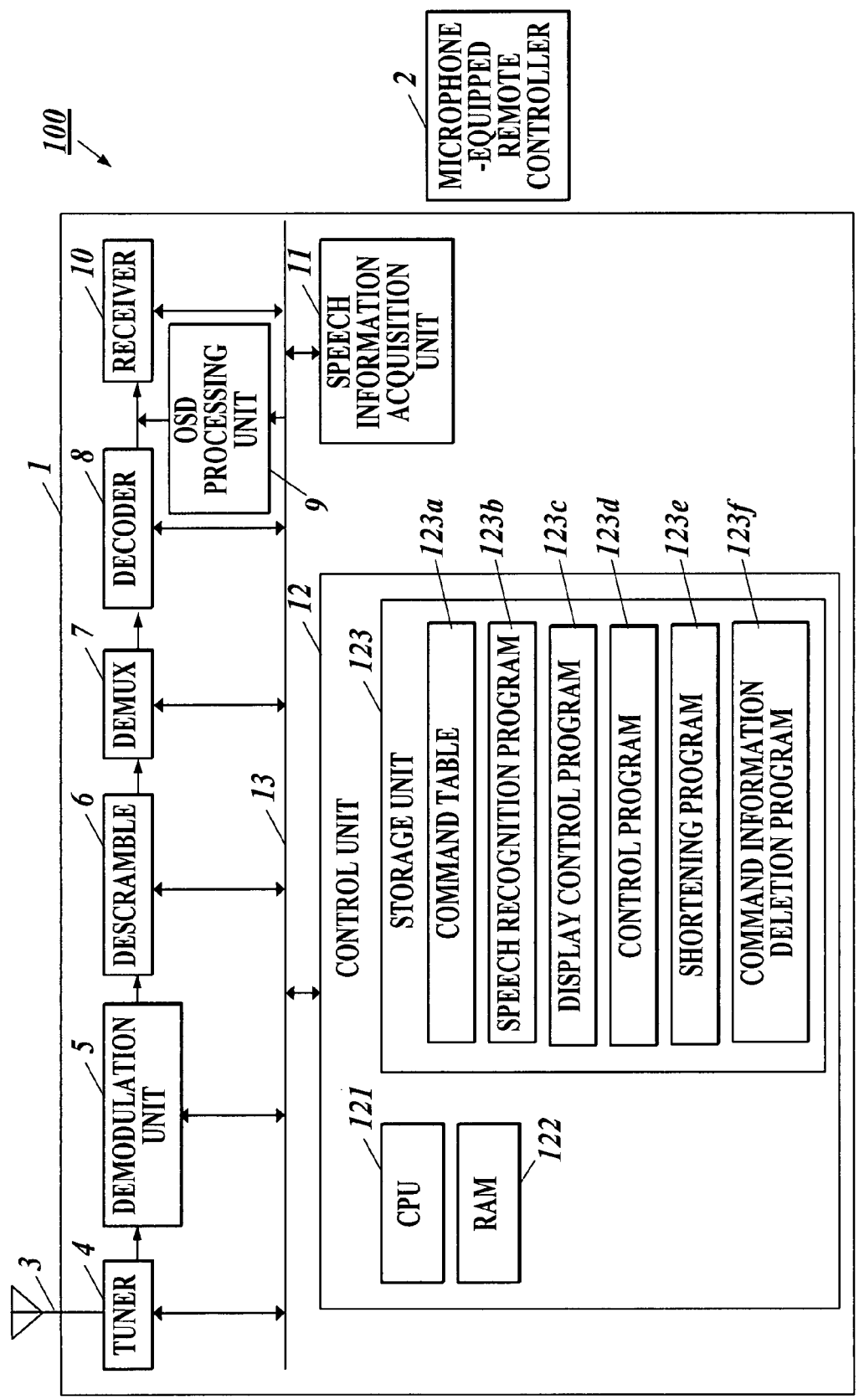
FIG. 1 is a block diagram showing a configuration of main portions of a digital television set according to the present invention.

A description will be made below in detail of an embodiment of the present invention while referring to the drawings.

Note that the description will be made of the embodiment by taking a digital television set as an example of an electronic instrument. However, the electronic instrument is not limited to the digital television set, and for example, may be electrical appliances such as a videotape recorder and an air conditioner.

First, a description will be made of a configuration of the entire instrument and a configuration of main portions thereof while referring to FIG. 1.

For example, a digital television set 100 of this embodiment comprises an instrument body portion 1 that receives television broadcast signals (hereinafter, referred to as broadcast signals), converts the received broadcast signals into predetermined output signals, and outputs video/audio data, and a microphone-equipped remote control device (hereinafter, referred to as a microphone-equipped remote controller) 2 as an instruction unit.

Next, the description will be made of the configuration of the main portions of the digital television set 100.

The instrument body portion 1 comprises an antenna 3 that receives the broadcast signals, a tuner 4 that selects a broadcast signal of a predetermined broadcast channel from the broadcast signals received by the antenna 3, a demodulation unit 5 that performs demodulation and error correction processing for the broadcast signal outputted from the tuner 4, a descrambler 6 that descrambles a scrambled signal for preventing illegal watching, which is added to the broadcast signal demodulated by the demodulation unit 5, a demultiplexer 7 that acquires the video/audio data by separating and extracting respective data from the broadcast signal descrambled by the descrambler 6, a decoder 8 that performs decompression processing for the video/audio data acquired by the demultiplexer 7, an on-screen character display (OSD) processing unit 9 as a display control unit for adding OSD data to the video data decompressed by the decoder 8, a receiver 10 as a display unit for outputting the video/audio data processed by the decoder 8 and the OSD processing unit 9, a speech information acquisition unit 11 that acquires speech information, a control unit 12 that controls the entirety of the instrument body portion 1 in a centralized manner, and a control bus 13 that interconnects the respective units.

For example, a microphone is used as the speech information acquisition unit 11, and the speech information acquisition unit 11 acquires speech directly as the speech information.

The speech information acquisition unit 11 functions as an instruction unit by acquiring speech information from a user, that control contents displayed in such a manner that a central processing unit (CPU) 121 executes a display control program 123c, are cancelled.

The speech information acquisition unit 11 may be designed not only to acquire the speech directly as the speech information but also to acquire a speech signal as the speech information, which is obtained after converting the speech into the speech signal.

For example, as shown in FIG. 1, the control unit 12 comprises the CPU 121, a random access memory (RAM) 122, a storage unit 123, and the like.

The CPU 121 performs a variety of control operations in accordance with a command table and a variety of processing programs, which are stored in the storage unit 123.

The RAM 122 comprises a program storage area for expanding the processing programs and the like, which are executed by the CPU 121, a data storage area that stores input data, processing results generated when the above-described processing programs are executed, and the like.

The storage unit 123 stores a system program executable by the instrument body portion 1, the variety of processing programs executable by the system program, data for use in the case of executing these variety of processing programs, data of results of arithmetic processing executed by the CPU 121, and the like. Note that the programs are stored in the storage unit 123 in a form of computer-readable program codes.

Specifically, for example, as shown in FIG. 1, in the storage unit 123, a command table 123a, a speech recognition program 123b, a display control program 123c, a control program 123d, a shortening program 123e, a command information deletion program 123f, and the like, are stored.

The command table 123a is a table that stores command information including speech information for controlling the instrument body portion 1.

Specifically, for example, as shown in FIG. 2, the command table 123a stores one kind of the command information and a plurality of acoustic model patterns so as to refer one kind of the command information to a plurality of acoustic model patterns. Moreover, the command table 123a stores a plurality of acoustic model patterns relating to each command information, the number of executions in which the command information corresponding to the acoustic model pattern is executed, and the number of cancellations in which the corresponding command information is cancelled so as to refer them to one another.

Furthermore, the command table 123a stores each command information and the command to be displayed, which indicates the control contents of the command information, so as to refer them to each other.

The storage unit 123 stores the command table 123a, and functions as a command information storage unit.

The speech recognition program 123b is a program that allows the CPU 121 to realize a function to perform speech recognition processing for the speech information acquired by the speech information acquisition unit 11.

Here, the speech recognition is realized, for example, by using speech recognition software named Julius, and by accumulating statistical data of large numbers of speech patterns and language patterns. A basic principle of the speech recognition is as follows. Specifically, frequency patterns of acoustic models (phonemes, each of which substantially corresponds to one alphabetical character and syllables, each of which corresponds to a kana character of Japanese) are held. Then, while a word dictionary is referred, each of the model patterns is matched with a signal of a syllable row obtained by cutting out a monosyllabic portion of a speech wave signal of the input speech. In such a way, the speech recognition is performed.

Specifically, the CPU 121 performs the speech recognition for the speech information acquired by the speech information acquisition unit 11 by using one acoustic model pattern of the plurality of preset acoustic model patterns, and extracts command information that coincides with a result of the speech recognition from the command table 123a. Moreover, when the command information that coincides with the result is not present in the command table 123a as a result of the speech recognition by the one acoustic model pattern, the CPU 121 changes the acoustic model pattern, performs the speech recognition one more time, and extracts command information that coincides with the result of the speech recognition from the command table 123a.

The display control program 123c is a program that allows the CPU 121 to realize a function to display the control content corresponding to the command information based on the result of the speech recognition, on the receiver 10.

Specifically, as shown in FIG. 3, by executing the display control program 123c, the CPU 121 extracts a command to be displayed from the command table 123a, which corresponds to the one command information obtained based on the result of the speech recognition, for example, as shown in FIG. 2. Then, the CPU 121 processes the command to be displayed in the OSD processing unit 9, and displays the command to be displayed on the receiver 10 as the display unit.

The CPU 121 executes the display control program 123c, and functions as the display control unit.

The control program 123d is a program that allows the CPU 121 to realize a function to control the instrument body portion 1 by using the command information based on the speech recognition result.

Specifically, for example, when the speech information acquisition unit 11 does not instruct that the control for the control content corresponding to the command information based on the result of the speech recognition is cancelled by the speech information within a predetermined standby time since the control content starts to be displayed on the receiver 10 by executing the display control program 123c, the CPU 121 performs the control based on the command information based on the result of the speech recognition by executing the control program 123d after the predetermined standby time elapses. Meanwhile, when by the speech information, the speech information acquisition unit 11 instructs that the control for the control content is cancelled, the CPU 121 cancels the control based on the command information based on the result of the speech recognition by the control program 123d.

The CPU 121 executes the control program 123d, and functions as a control unit.

The shortening program 123e is a program that allows the CPU 121 to realize a function to shorten the predetermined standby time since the control content corresponding to the command information based on the result of the speech recognition start to be displayed on the receiver 10 by executing the display control program 123c.

Specifically, when the ratio of the number of executions in which one kind of the command information based on the result of the speech recognition is executed with respect to the number of displays in which the control content corresponding to the one kind of command information are displayed on the receiver 10 by the display control program 123c exceeds a first set value, the CPU 121 shortens the standby time by executing the shortening program 123e.

The CPU 121 executes the shortening program 123e, and functions as a shortening unit.

Note that it is possible to provide the first set value of the standby time in stages. For example, the standby time may be set so as to be shortened in the following manner. Specifically, when the ratio of the number of executions in which the one kind of command information based on the result of the speech recognition is executed with respect to the number of displays in which the control content corresponding to the one kind of command information is displayed on the receiver 10 by the display control program 123c is 85% or more, the standby time is set to five seconds. When the ratio is 90% or more, the standby time is shortened to three seconds. When the ratio is 95% or more, the standby time is shortened to zero second.

The command information deletion program 123f is a program that allows the CPU 121 to realize a function to delete one acoustic model pattern relating to the one kind of command information stored in the command table 123a.

Specifically, when a ratio of the number of cancellations in which the one kind of command information based on the result of the speech recognition by the one acoustic model pattern is cancelled with respect to the number of displays in which the control content corresponding to the one kind of command information is displayed on the receiver 10 by executing the display control program 123c exceeds a second set value, the CPU 121 deletes the one acoustic model pattern relating to the one kind of command information from the command table 123a by executing the command information deletion program 123e.

The CPU 121 executes the command information deletion program 123f, and functions as a command information deletion unit.

Figure 4:
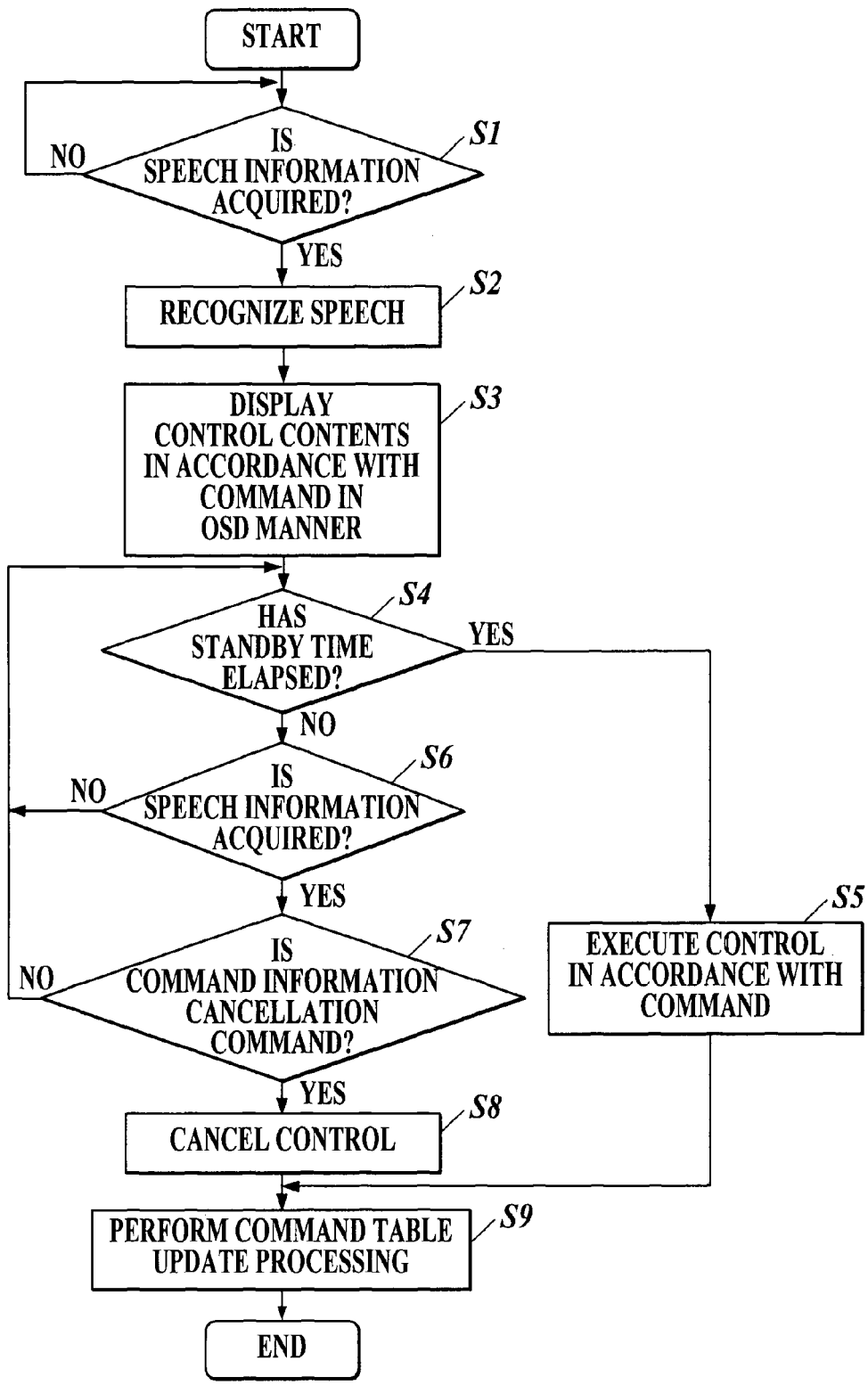
FIG. 4 is a flowchart showing operation processing of an instrument body portion in the present invention.

Next, a description will be made of an operation of the instrument body portion 1 of the present invention by using FIG. 4.

First, when, in Step S1, the instrument body portion 1 is in a standby state for acquiring the speech information, and the CPU 121 determines that the speech information is acquired by the speech information acquisition unit 11 (Step S1: Yes), the CPU 121 proceeds to Step S2. Meanwhile, when the CPU 121 determines that the speech information is not acquired (Step S1: No), the instrument body portion 1 is in the speech information acquisition standby state again.

Subsequently, in Step S2, the CPU 121 performs the speech recognition for the acquired speech information by executing the speech recognition program 123b.

Specifically, for example, when the speech information "ON" is acquired by the speech information acquisition unit 11, the CPU 121 performs the speech information by using an acoustic model pattern "1", and extracts the command information "ON" that coincides with the result of the speech recognition, from the command table 123a.

Subsequently, in Step S3, the CPU 121 extracts a command to be displayed, which corresponds to the command information based on the result of the speech recognition, from the command table 123a by executing the display control program 123c, and displays the command to be displayed on the receiver 10 by processing the command to be displayed in the OSD processing unit 9.

Specifically, for example, when the command information "ON" is extracted as the result of the speech recognition, the CPU 121 extracts a command to be displayed "Result of speech recognition: Are you sure the speech is 'ON'?", which corresponds the command information, and as shown in FIG. 3, displays the command to be displayed "Result of speech recognition: Are you sure the speech is 'ON'?" on the receiver 10.

Subsequently, in Step S4, by executing the control program 123d, the CPU 121 determines whether or not the predetermined standby time since the control content corresponding to the command information based on the result of the speech recognition start to be displayed on the receiver 10 has elapsed. Then, in the case that it is determined that the predetermined standby time has elapsed (Step S4: Yes), the CPU 121 proceeds to Step S5, and executes the control for the instrument body portion 1 in accordance with the command information obtained based the result of the speech recognition. Then, the CPU 121 proceeds to Step S9.

Meanwhile, in Step S4, in the case that it is determined that the predetermined standby time has not elapsed (Step S4: No), the CPU 121 proceeds to Step S6. The instrument body portion 1 enters the standby state for acquiring the speech information from the user.

Subsequently, in Step S6, in the case that it is determined that the speech information is acquired by the speech information acquisition unit 11 (Step S6: Yes), the CPU 121 proceeds to Step S7. Then, the CPU 121 performs the speech recognition for the speech information acquired from the outside by executing the speech recognition program 123b, and determines whether or not the obtained command information is a cancellation command. Meanwhile, in Step S6, in the case that it is determined that the speech information is not acquired (Step S6: No), the CPU 121 returns to Step S4.

Specifically, when the user desires to cancel the control corresponding to the display "Result of speech recognition: Are you sure the speech is 'ON'?", for example, as shown in FIG. 3, the user inputs speech information "Cancel" to the speech information acquisition unit 11. The CPU 121 performs the speech recognition for the speech information "Cancel".

Subsequently, in Step S7, in the case that it is determined that there is command information corresponding to the cancellation command as a result of the speech recognition (Step S7: Yes), the CPU 121 proceeds to Step S8. Meanwhile, in Step S7, in the case that it is determined that there is no command information corresponding to the cancellation command as the result of the speech recognition (Step S7: No), the CPU 121 returns to Step S4.

Subsequently, in Step S8, by executing the control program 123d, the CPU 121 cancels the control in accordance with the command information obtained based on the result of the speech recognition. Then, the CPU 121 proceeds to Step S9.

Subsequently, in Step S9, the CPU 121 executes the shortening program 123e and the command information deletion program 123f, and performs command table update processing which will be described later. In such a way, the CPU 121 finishes the processing.

Figure 5:
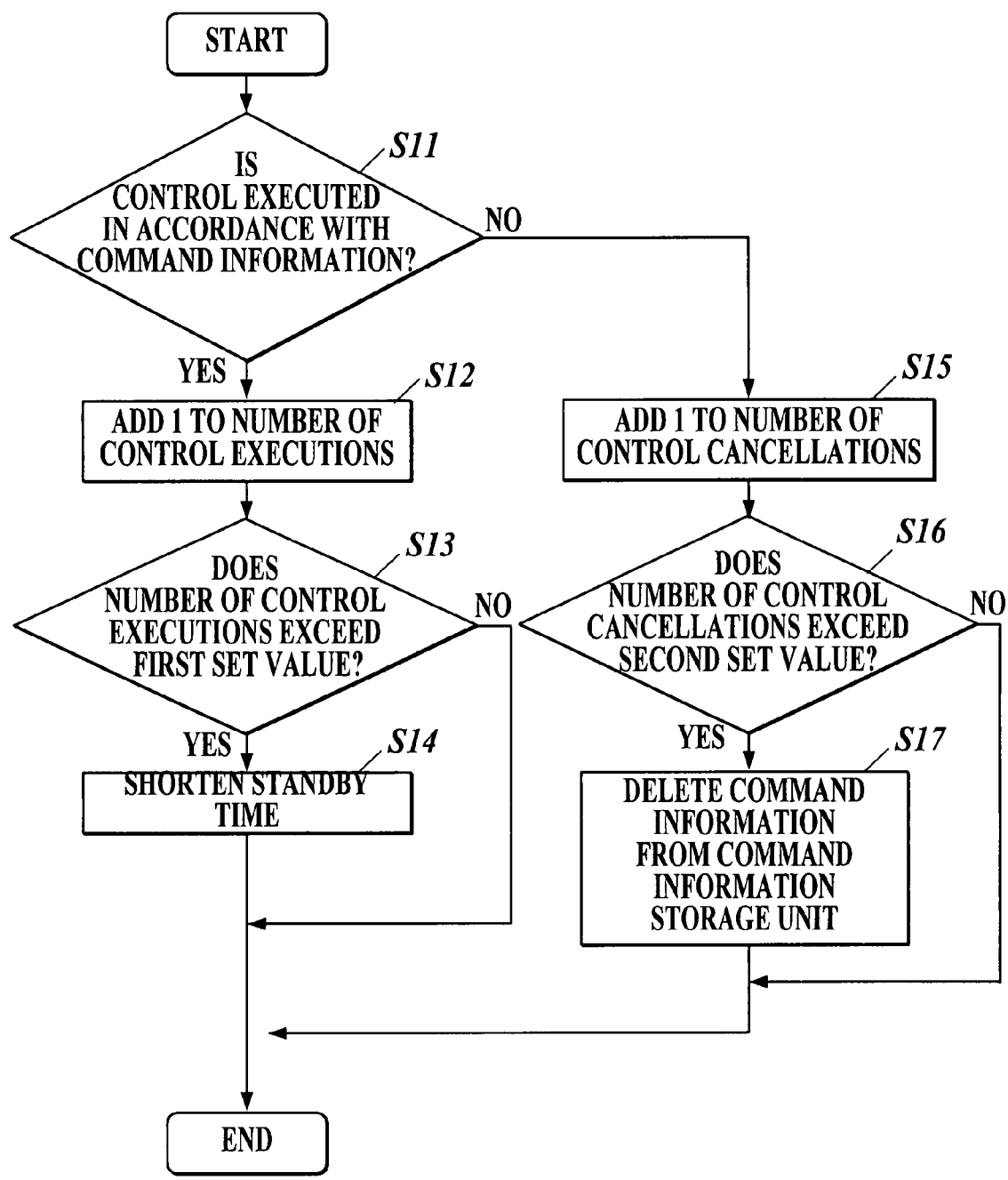
FIG. 5 is a flowchart showing command table update processing in the present invention.

Next, by using FIG. 5, a description will be made of the update processing for the command table 123a in Step S9 in FIG. 4.

First, in Step S11, when the control based on the command information obtained based on the result of the speech recognition is executed by executing the control program 123d (Step S11: Yes), the CPU 121 proceeds to Step S12. Then, the CPU 121 adds "1" to the number of control executions, and proceeds to Step S13.

Specifically, for example, as shown in FIG. 2, when the control based on the command "ON" corresponding to an acoustic model pattern 1 is executed, the CPU 121 adds "1" to the number of control executions. The number of executions becomes "13" from "12".

Meanwhile, in Step S11, when the control based on the command information obtained based on the result of the speech recognition is cancelled by executing the control program 123d (Step S11: No), the CPU 121 proceeds to Step S15. Then, the CPU 121 adds "1" to the number of control cancellations, and proceeds to Step S16.

Specifically, for example, as shown in FIG. 2, when the control based on the command "ON" corresponding to an acoustic model pattern 2 is cancelled, the CPU 121 adds "1" to the number of control cancellations. The number of cancellations becomes "20" from "19".

Subsequently, in Step S13, in the case that it is determined that the ratio of the number of executions exceeds the first set value (Step S13: Yes), the CPU 121 proceeds to Step S14. The CPU 121 shortens the predetermined standby time by executing the shortening program. Meanwhile, in Step S13, in the case that it is determined that the ratio does not exceed the first set value (Step S13: No), the CPU 121 finishes the processing.

Specifically, for example, as shown in FIG. 2, when it is determined that the ratio of the number of control executions based on the command "ON" corresponding to the acoustic model pattern 1 exceeds the first set value, the standby time is shortened, for example, to two seconds from five seconds.

Subsequently, in Step S16, in the case that it is determined that the ratio of the number of cancellations exceeds the second set value (Step S16: Yes), the CPU 121 proceeds to Step S17. The CPU 121 deletes the one acoustic model pattern relating to the command information from the command table 123a by executing the command information deletion program 123f. Meanwhile, in Step S16, in the case that it is determined that the ratio does not exceed the second set value (Step S16: No), the CPU 121 finishes the processing.

Specifically, for example, as shown in FIG. 2, when it is determined that the ratio of the number of control cancellations for the command "ON" corresponding to the acoustic model pattern 2 exceeds the second set value, the CPU 121 deletes the acoustic model pattern 2 relating to the command information from the command table 123a.

In accordance with the digital television set 100 according to the present invention, which is described above, when the CPU 121 executes the display control program 123c, the control content corresponding to the command information based on the result of the speech recognition by the acoustic model pattern can be displayed on the receiver 10. Moreover, by the speech information acquisition unit 11, the speech information that the control is cancelled, is acquired. As a result, it is possible to instruct that the control for the control content displayed on the receiver 10 by executing the display control program 123c is cancelled. Furthermore, the control can be performed by executing the control program 123d using the CPU 121 based on the command information based on the result of the speech recognition after a predetermined standby time elapses since the control content corresponding to the command information based on the result of the speech recognition starts to be displayed on the receiver 10 by executing the display control program 123c, in case that there is no instruction that the control for the control content obtained when the speech information acquisition unit 11 acquires the speech information that the control is cancelled, is cancelled within the predetermined standby time. Meanwhile, in case that there is instruction that the control for the control content obtained when the speech information acquisition unit 11 acquires the speech information that the control is cancelled, is cancelled, it is possible to cancel the control based on the command information based on the result of the speech recognition.

Hence, it is possible to control the electronic instrument after the user confirms whether or not the control content corresponding to the command information obtained based on the result of the speech recognition is one intended by the user. In such a way, a malfunction of the electronic instrument, which is caused by erroneous recognition, can be prevented in advance.

Moreover, by the command table 123a, the one kind of command information and the plurality of acoustic model patterns can be stored so as to refer the one kind of command information to the plurality of acoustic model patterns. Furthermore, the standby time can be shortened by executing the shortening program 123e when the ratio of the number of executions in which the one kind of command information based on the result of the speech recognition is executed with respect to the number of displays in which the control content corresponding to the one kind of command information is displayed on the receiver 10 by executing the display control program 123c, exceeds the first set value.

Hence, with regard to the command information in which a success rate of the speech recognition is high, it is possible to shorten the standby time since the control content corresponding to the command information based on the result of the speech recognition start to be displayed on the receiver 10. Thus, it is possible to rapidly perform the control corresponding to the command information obtained based on the result of the speech recognition.

Furthermore, the one acoustic model pattern relating to the one kind of command information can be deleted from the command table 123a by executing the command information deletion program 123f using the CPU 121 when the ratio of the number of cancellations in which the one kind of command information based on the result of the speech recognition by the one acoustic model pattern is cancelled with respect to the number of displays in which the control content corresponding to the one kind of command information is displayed on the receiver 10 by executing the display control program 123c, exceeds the second set value.

Hence, with regard to the one acoustic model pattern relating to the command information in which a possibility of the erroneous recognition is high, it is possible to delete the one acoustic model pattern from the command table 123a. In such a way, it is possible to prevent in advance the malfunction of the instrument body portion 1, which is caused by the erroneous recognition, and it is possible to customize the command table 123a.

Note that the present invention is not limited to the above-described embodiment, and a variety of modifications and design changes may be performed within the scope without departing from the gist of the present invention.

For example, the instruction unit is not limited to the case of inputting the speech information that the control is cancelled, from the outside. The instruction unit in which an operation key for cancelling the control is provided on a remote controller or the like, may be adopted. Thereby, the control is cancelled.

The entire disclosure of Japanese Patent Application No. 2006-113635 filed on Apr. 17, 2006 is incorporated herein by reference in its entirety.

What is claimed is:

1. An electronic instrument which performs speech recognition by an acoustic model pattern for speech information inputted from an outside, and which is controlled by command information obtained based on a result of the speech recognition, the electronic instrument comprising:

a display control unit for displaying a control content corresponding to the command information based on the result of the speech recognition, on a display unit;

an instruction unit for instructing that a control for the control content displayed on the display unit by the display control unit, is cancelled;

a control unit for performing the control based on the command information based on the result of the speech recognition after a predetermined standby time elapses since the control content corresponding to the command information based on the result of the speech recognition starts to be displayed on the display unit by the display control unit when the instruction unit does not instruct that the control for the control content is cancelled within the predetermined standby time, and for cancelling the control based on the command information based on the result of the speech recognition when the instruction unit instructs that the control for the control content is cancelled within the predetermined standby time;

a shortening unit for shortening the standby time when a ratio of the number of executions in which one kind of the command information based on the result of the speech recognition is executed with respect to the number of displays in which a control content corresponding to the one kind of command information is displayed on the display unit by the display control unit, exceeds a first set value;

a command information storage unit for storing the one kind of command information and a plurality of the acoustic model patterns so as to refer the one kind of command information to the plurality of the acoustic model patterns; and a command information deletion unit for deleting one acoustic model pattern relating to the one kind of command information from the command information storage unit when a ratio of the number of cancellations in which the one kind of command information based on the result of the speech recognition by the one acoustic model pattern is cancelled with respect to the number of displays in which the control content corresponding to the one kind of command information is displayed on the display unit by the display control unit, exceeds a second set value.

2. An electronic instrument which performs speech recognition by an acoustic model pattern for speech information inputted from an outside, and which is controlled by command information obtained based on a result of the speech recognition, the electronic instrument comprising:

a display control unit for displaying a control content corresponding to the command information based on the result of the speech recognition, on a display unit;

an instruction unit for instructing that a control for the control content displayed on the display unit by the display control unit, is cancelled;

a control unit for performing the control based on the command information based on the result of the speech recognition after a predetermined standby time elapses since the control content corresponding to the command information based on the result of the speech recognition starts to be displayed on the display unit by the display control unit when the instruction unit does not instruct that the control for the control content is cancelled within the predetermined standby time, and for cancelling the control based on the command information based on the result of the speech recognition when the instruction unit instructs that the control for the control content is cancelled within the predetermined standby time, and a shortening unit for shortening the standby time when a ratio of the number of executions in which one kind of the command information based on the result of the speech recognition is executed with respect to the number of displays in which a control content corresponding to the one kind of command information is displayed on the display unit by the display control unit, exceeds a first set value.

3. The electronic instrument as claimed in claim 2, further comprising:

a command information storage unit for storing one kind of command information and a plurality of the acoustic model patterns so as to refer the one kind of command information to the plurality of the acoustic model patterns; and a command information deletion unit for deleting one acoustic model pattern relating to the one kind of command information from the command information storage unit when a ratio of the number of cancellations in which the one kind of command information based on the result of the speech recognition by the one acoustic model pattern is cancelled with respect to the number of displays in which a control content corresponding to the one kind of command information is displayed on the display unit by the display control unit, exceeds a second set value.

* * * * *